US012552152B2

(12) United States Patent
Arakane

(10) Patent No.: US 12,552,152 B2
(45) Date of Patent: Feb. 17, 2026

(54) LIQUID EJECTION APPARATUS

(71) Applicant: BROTHER KOGYO KABUSHIKI KAISHA, Nagoya (JP)

(72) Inventor: Satoru Arakane, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 426 days.

(21) Appl. No.: 18/176,660

(22) Filed: Mar. 1, 2023

(65) Prior Publication Data

US 2023/0311485 A1 Oct. 5, 2023

(30) Foreign Application Priority Data

Mar. 30, 2022 (JP) ................................ 2022-057040

(51) Int. Cl.
*B41J 2/045* (2006.01)

(52) U.S. Cl.
CPC ....... *B41J 2/04536* (2013.01); *B41J 2/04586* (2013.01)

(58) Field of Classification Search
CPC ................ B41J 2/04551; B41J 2/04586; B41J 2/04581; B41J 2/04588; B41J 2/04536
See application file for complete search history.

(56) References Cited

U.S. PATENT DOCUMENTS

2004/0165033 A1* 8/2004 Chikuma ............. B41J 2/04551 347/41
2007/0126768 A1* 6/2007 Silverbrook ........... B41J 2/2139 347/5
2008/0068411 A1 3/2008 Koase
2012/0056924 A1* 3/2012 Yoshida .................. B41J 29/38 347/12

FOREIGN PATENT DOCUMENTS

EP 1216838 A 6/2002
JP 2002-210937 A 7/2002
JP 2007-320110 A 12/2007

* cited by examiner

*Primary Examiner* — Thinh H Nguyen
(74) *Attorney, Agent, or Firm* — Merchant & Gould P.C.

(57) ABSTRACT

A carriage on which a head is mounted moves in a second direction crossing a first direction. A driving circuit is configured to output a drive signal to each of nozzles. A controller is configured to perform: storing, in a memory, image data of an image to be formed; and controlling the driving circuit to: output the drive signal for a first nozzle in the first nozzle array based on first data among one-line image data stored in the memory; and output the drive signal for a second nozzle in the second nozzle array based on second data among the one-line image data. The one-line image data is the image data for one line in the second direction in the image. The first data forms odd-numbered dots of the one line in the second direction in the image. The second data forms even-numbered dots of the one line.

6 Claims, 7 Drawing Sheets

LIQUID EJECTION APPARATUS

REFERENCE TO RELATED APPLICATIONS

This application claims priority from Japanese Patent Application No. 2022-057040 filed on Mar. 30, 2022. The entire content of the priority application is incorporated herein by reference.

BACKGROUND ART

A liquid ejection apparatus that forms dots on a medium with high resolution and at high speed is known.

DESCRIPTION

A liquid ejection apparatus has a first nozzle array in which a plurality of nozzles are arranged at a particular pitch, and a second nozzle array in which a plurality of nozzles are arranged at the same pitch, the second nozzle array being shifted in a direction in which the nozzles are arranged relative to the position of the first nozzle array.

In a liquid ejection apparatus, it is necessary to generate nozzle control signals based on image data of an image to be formed. However, a specific method is not disclosed for generating nozzle control signals based on image data. In particular, a method is not disclosed for generating nozzle drive signals based on image data while reducing the amount of memory.

In view of the foregoing, an example of an object of this disclosure is to provide a technique for generating nozzle drive signals based on image data while reducing the amount of memory required when liquid is ejected at high speed.

According to one aspect, this specification discloses a liquid ejection apparatus. The liquid ejection apparatus includes a head, a carriage, a driving circuit, a memory, and a controller. The head includes at least a first nozzle array and a second nozzle array. The first nozzle array includes nozzles arranged at a particular pitch in a first direction. The second nozzle array includes nozzles arranged at the particular pitch in the first direction. The nozzles in the second nozzle array are located at positions shifted from the nozzles in the first nozzle array in the first direction. The head is mounted on the carriage. The carriage is configured to move in a second direction crossing the first direction. The driving circuit is configured to output a drive signal to each of the nozzles. The controller is configured to perform: storing, in the memory, image data of an image to be formed; and controlling the driving circuit to: output the drive signal for a first nozzle in the first nozzle array based on first data among one-line image data stored in the memory; and output the drive signal for a second nozzle in the second nozzle array based on second data among the one-line image data. The one-line image data is the image data for one line in the second direction in the image. The first data forms odd-numbered dots of the one line in the second direction in the image. The second data forms even-numbered dots of the one line in the second direction in the image. According to the liquid ejection apparatus described above, liquid is ejected at high speed by alternately ejecting liquid from the two nozzles based on image data for one line. Further, the driving circuit outputs the drive signal for the first nozzle and the drive signal for the second nozzle based on image data for one line stored in the memory. Thus, the drive signals for the nozzles are generated based on the image data without using a memory other than the above-mentioned memory. Thus, when ejecting liquid at high speed, the drive signals for the nozzles are generated based on the image data while reducing the amount of memory.

Figure 1:
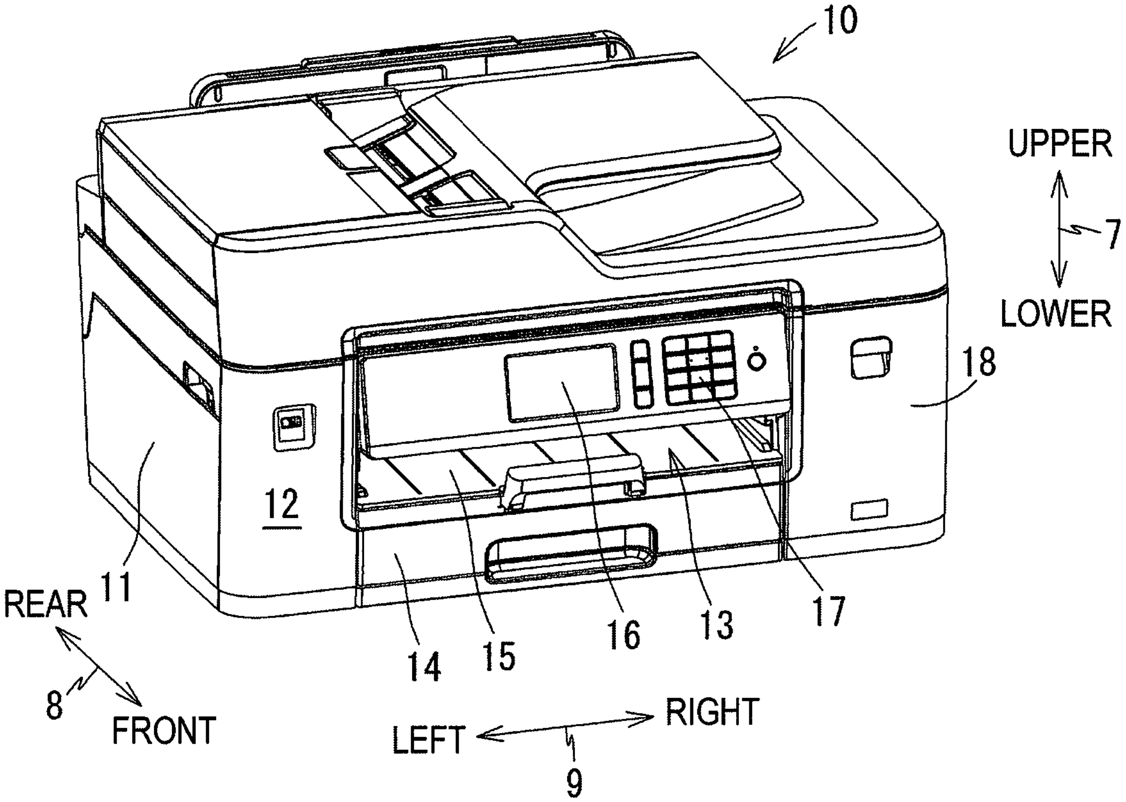
FIG. 1 is an external perspective view of a printer 10.

Hereinafter, an embodiment of the present disclosure will be described. An upper-lower direction 7 is defined with reference to a state in which a printer 10 is installed for use (the state shown in FIG. 1), a front-rear direction 8 is defined assuming that a surface of the printer 10 in which an opening 13 is formed as the front surface, and a left-right direction 9 is defined when the printer 10 is viewed from the front. The upper-lower direction 7, the front-rear direction 8, and the left-right direction 9 are perpendicular to each other.

[Overview of Printer 10]

The printer 10 according to this embodiment is an example of a liquid ejection apparatus that ejects liquid onto a sheet by an inkjet printing method. The printer 10 is a monochrome printer that ejects black ink (an example of liquid) onto a sheet. The printer 10 may be a so-called "multifunction peripheral (MFP)" having functions such as a facsimile function, a scan function, and a copy function.

Figure 2:
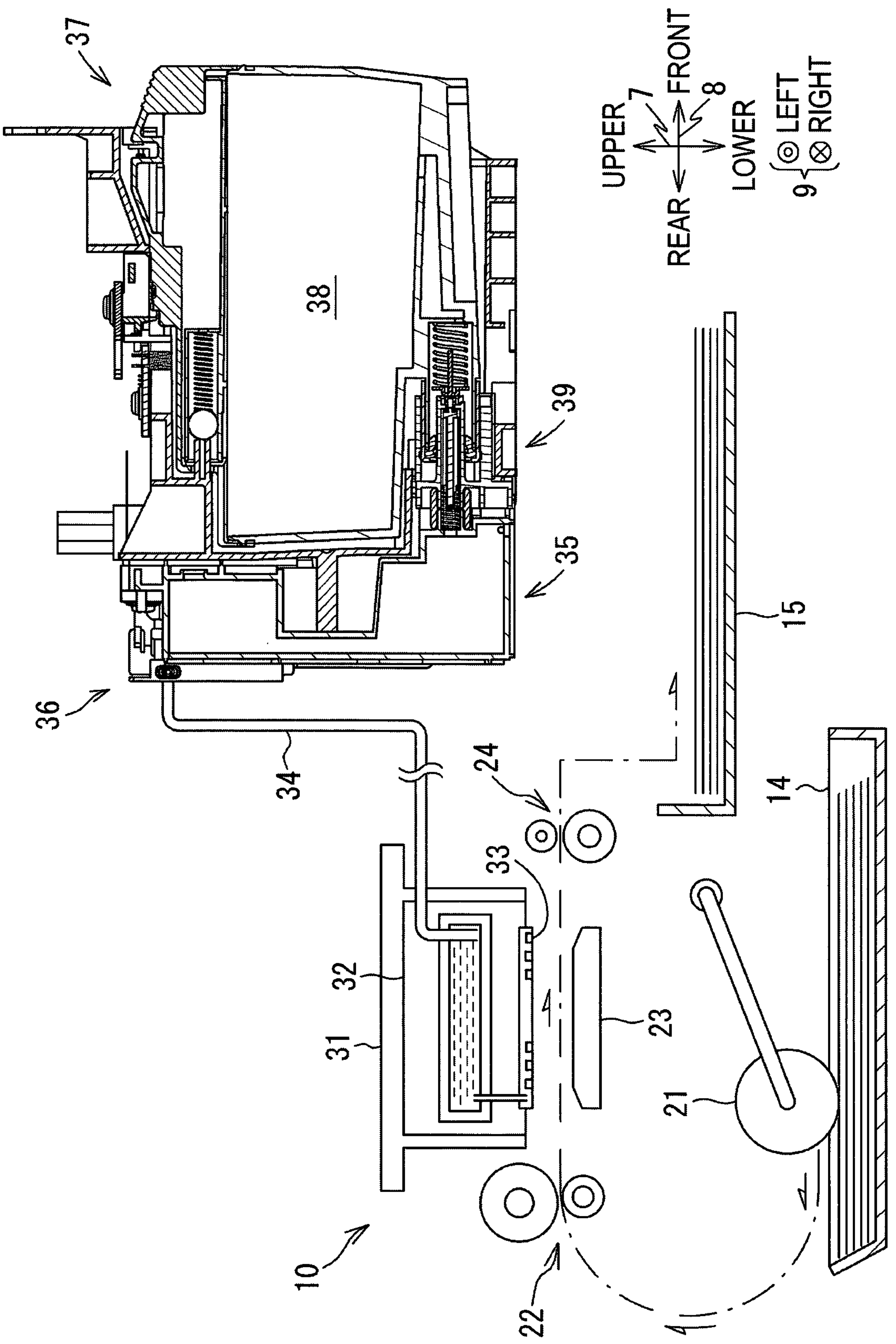
FIG. 2 is a vertical cross-sectional view schematically showing an internal structure of the printer 10.

The printer 10 has a housing 11 having a generally rectangular parallelepiped shape. As shown in FIGS. 1 and 2, a feed tray 14, a feed roller 21, a conveyance roller 22, a carriage 31, a head 32 mounted on the carriage 31 and having a plurality of nozzles 33, a platen 23 facing the head 32, a discharge roller 24, a discharge tray 15, a sub-tank 35, a mount case 36 to which a cartridge 37 is attachable, and a tube 34 for communicating the cartridge 37 attached to the mount case 36 with the head 32 are located inside the housing 11. In the head 32, the plurality of nozzles 33 are arranged in the front-rear direction 8.

The printer 10 drives the feed roller 21 and the conveyance roller 22 to convey the sheet supported by the feed tray 14 along a conveyance path (the path indicated by the single-dot chain line in FIG. 2) to the position of the platen 23. Next, the printer 10 causes the nozzles 33 of the head 32 to eject ink supplied from the cartridge 37 attached to the mount case 36 via the sub-tank 35 and the tube 34. Thereby, the ink lands on the sheet supported by the platen 23, and an image to be formed is printed on the sheet. The printer 10 drives the discharge roller 24 to discharge the sheet on which the image is printed to the discharge tray 15.

The carriage 31 is supported by two guide rails (not shown) extending in the left-right direction 9, and reciprocates in the left-right direction 9 crossing the front-rear direction 8. The printer 10 ejects ink from the nozzles 33 of the head 32 while the carriage 31 moves in the left-right direction 9. Thereby, an image is printed on a partial area of the sheet facing the head 32. Next, the printer 10 causes the conveyance roller 22 to convey the sheet such that an area in which an image is to be printed next faces the head 32. An image is printed on the sheet by alternately and repeatedly executing these processes.

As shown in FIG. 1, the housing 11 has a cover 18 on a front surface 12 of the housing 11 and at the right end in the left-right direction 9. An opening (not shown) is formed at the position of the cover 18. The cover 18 is pivotable between a position for closing the opening (the position shown in FIG. 1) and a position for opening the opening. One mount case 36 is located in an accommodation space inside the housing 11 that extends to the depth of the opening. The cartridge 37 storing black ink is attached to the mount case 36.

The cartridge 37 has a liquid chamber 38 (see FIG. 2) configured to store ink. When the cartridge 37 is attached to the mount case 36, the ink stored in the liquid chamber 38 flows into the sub-tank 35 via an ink channel 39 communicating the liquid chamber 38 and the sub-tank 35. The sub-tank 35 temporarily stores the ink that has flowed in. The ink stored in the sub-tank 35 is supplied to the head 32 via the tube 34.

[Controller 40]

Figure 3:
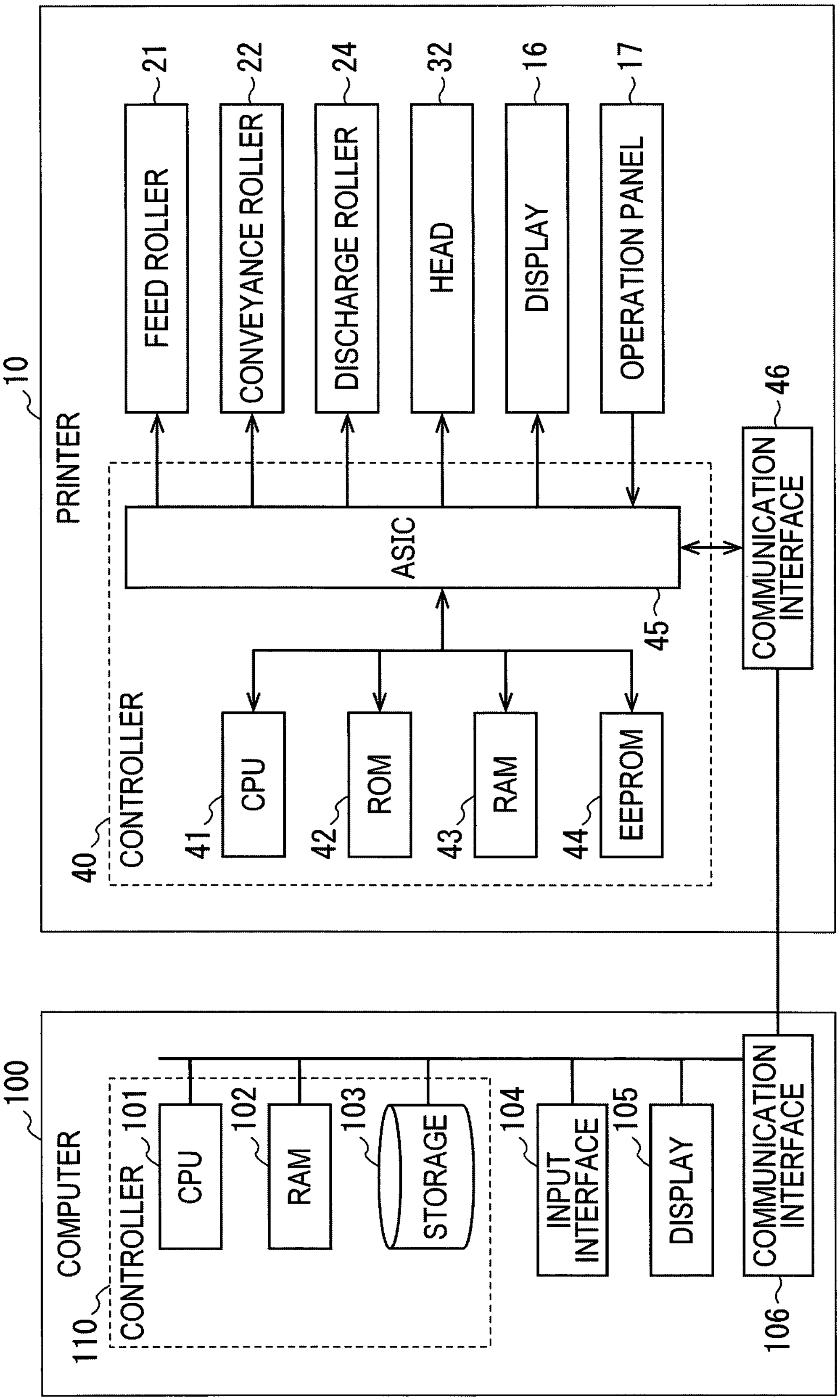
FIG. 3 is a block diagram of a print system including the printer 10 and a computer 100.

A controller 40 shown in FIG. 3 is located inside the housing 11. The controller 40 includes a CPU 41, a ROM 42, a RAM 43, an EEPROM 44, and an ASIC 45. The ROM 42 stores programs and so on for the CPU 41 to execute various processes. The RAM 43 is used as a storage area for temporarily storing data and signals used when the CPU 41 executes programs, or as a work area for data processing. The EEPROM 44 stores information to be kept even after the power is turned off.

The ASIC 45 is for operating the feed roller 21, the conveyance roller 22, the discharge roller 24, and the head 32. The controller 40 drives a motor (not shown) via the ASIC 45, thereby rotating the feed roller 21, the conveyance roller 22, and the discharge roller 24. The controller 40 outputs drive signals to drive elements (not shown) of the head 32 via the ASIC 45, thereby causing the nozzles 33 of the head 32 to eject ink. The ASIC 45 outputs drive signals corresponding to the amount of ink to be ejected from the nozzles 33.

A display 16 and an operation panel 17 are connected to the ASIC 45. The display 16 is, for example, a liquid crystal display, an organic EL display, and so on. The display 16 displays, for example, the status of the printer 10 on the screen. The operation panel 17 outputs, to the controller 40, an operation signal in response to an operation by a user. The operation panel 17 may have push buttons, for example, and/or may have a touch sensor superimposed on the display 16.

A communication interface 46 is connected to the ASIC 45. The communication interface 46 is an interface for performing communication between the printer 10 and other devices. The communication interface 46 is, for example, a wireless or wired communication interface such as USB, Wi-Fi, Bluetooth ("Wi-Fi is a registered trademark of Wi-Fi Alliance. "Bluetooth" is a registered trademark of Bluetooth SIG, Inc.). The printer 10 performs communication with other devices connected to the printer 10 by controlling the communication interface 46.

[Computer 100]

In the print system shown in FIG. 3, a computer 100 is connected to the printer 10. The computer 100 is any type of computer connectable to the printer 10. The computer 100 is, for example, a personal computer, a mobile phone, and so on. The computer 100 includes a CPU 101, a RAM 102, a storage 103, an input interface 104, a display 105, and a communication interface 106. The CPU 101, the RAM 102, and the storage 103 function as a controller 110 of the computer 100. The storage 103 is, for example, a hard disk, an SSD drive, and so on. The storage 103 stores programs and so on for the CPU 101 to execute various processes. The programs stored in the storage 103 include a printer driver for controlling the printer 10. The RAM 102 is used as a storage area for temporarily storing data and signals used when the CPU 101 executes programs, or as a work area for data processing. The communication interface 106 is an interface for performing communication with the printer 10.

The CPU 41 of the controller 40 of the printer 10 executes programs stored in the RAM 43, thereby executing various processes. The CPU 101 of the controller 110 of the computer 100 executes programs stored in the RAM 102, thereby executing various processes.

[Arrangement of Nozzles 33]

Figure 4C:
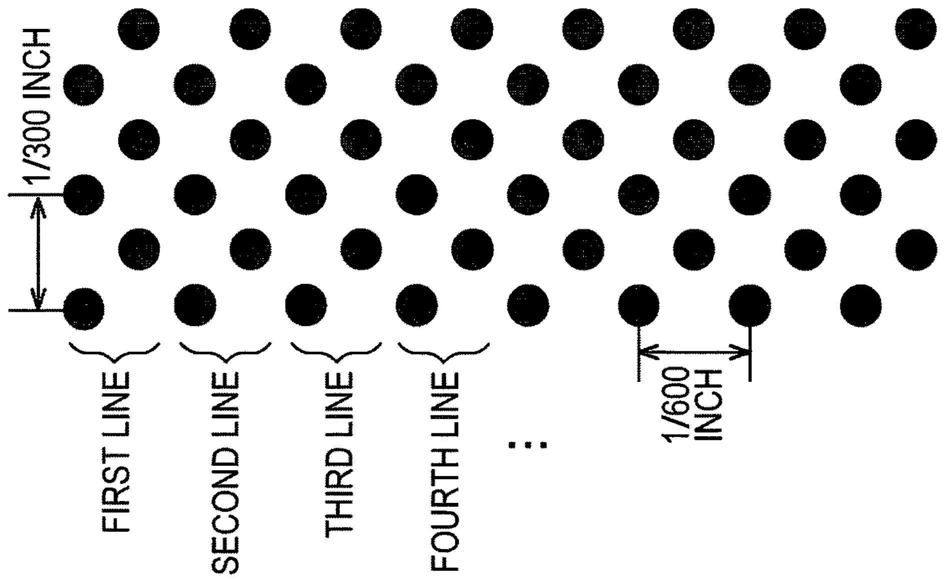
FIG. 4C is an enlarged view of an image printed in a high speed mode.
Figure 4B:
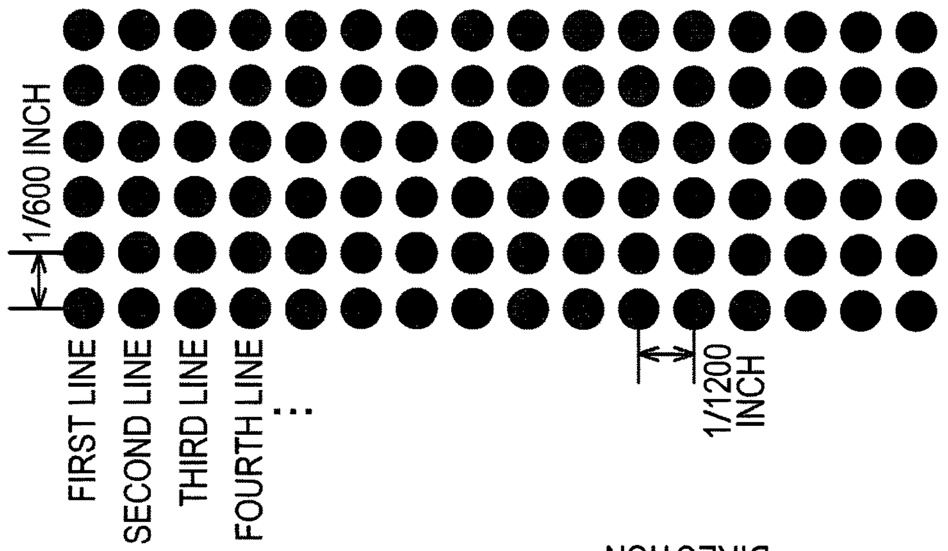
FIG. 4B is an enlarged view of an image printed in a high quality mode.
Figure 4A:
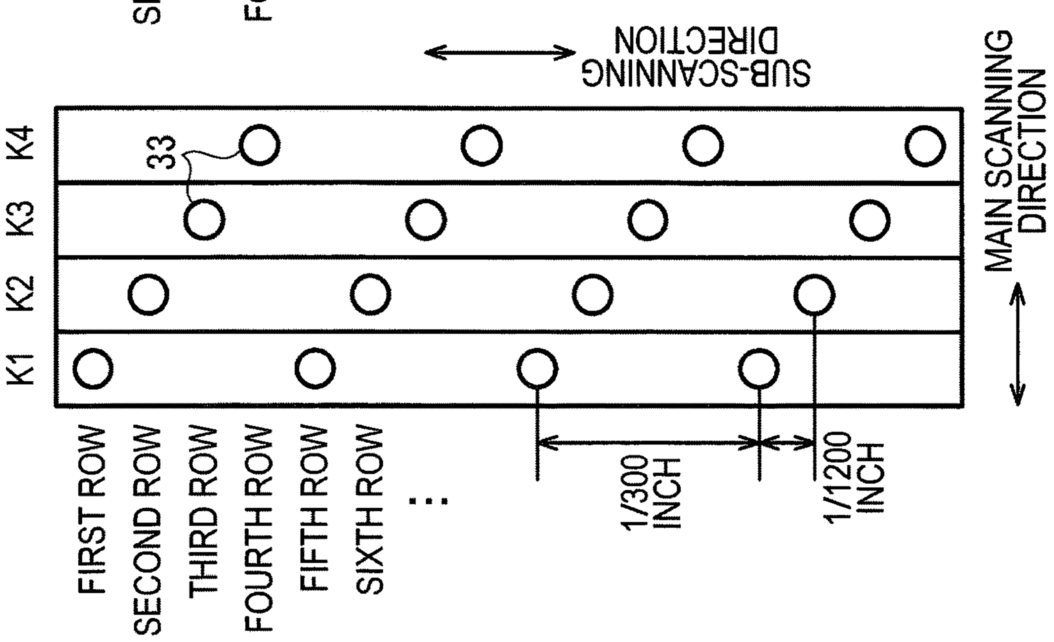
FIG. 4A is a diagram showing an arrangement of nozzles 33 in a head 32.

FIG. 4A shows an arrangement of the nozzles 33 in the head 32. In FIG. 4A, the horizontal direction is the moving direction of the carriage 31, and the vertical direction is a sheet conveyance direction. In the following description, the former is referred to as a main scanning direction and the latter is referred to as a sub-scanning direction. In this embodiment, the main scanning direction and the sub-scanning direction are perpendicular to each other. The white circles shown in FIG. 4A indicate the positions of the nozzles 33 when the head 32 is viewed from above.

The head 32 includes a first nozzle array K1, a second nozzle array K2, a third nozzle array K3, and a fourth nozzle array K4. The first nozzle array K1 is formed by arranging a plurality of nozzles 33 at a pitch P in the sub-scanning direction. Each of the second to fourth nozzle arrays K2 to K4 is formed by arranging the same number of nozzles 33 as the first nozzle array K1 at the same pitch P in the sub-scanning direction. In this embodiment, the pitch P is 1/300 inch. The second nozzle array K2 is located to the right of the first nozzle array K1. The third nozzle array K3 is located to the right of the second nozzle array K2. The fourth nozzle array K4 is located to the right of the third nozzle array K3. The distance between two nozzle arrays in the main scanning direction is arbitrary.

The positions of the nozzles 33 in the second nozzle array K2 in the sub-scanning direction are shifted by ¼ of the pitch P (that is, 1/1200 inch) from the positions of the nozzles 33 in the first nozzle array K1 in the sub-scanning direction. The positions of the nozzles 33 in the third nozzle array K3 in the sub-scanning direction are shifted by ½ of the pitch P from the positions of the nozzles 33 in the first nozzle array K1 in the sub-scanning direction. The positions of the nozzles 33 in the fourth nozzle array K4 in the sub-scanning direction are shifted by ¾ of the pitch P from the positions of the nozzles 33 in the first nozzle array K1 in the sub-scanning direction. The sub-scanning direction is an example of a first direction. The main scanning direction is an example of a second direction.

The nozzles 33 in the first to fourth nozzle arrays K1 to K4 are divided into groups of four in the order of arrangement in the sub-scanning direction, and the four nozzles 33 in each group correspond to each other. For example, the nozzles 33 located in the first to fourth rows correspond to each other, and the nozzles 33 located in the fifth to eighth rows correspond to each other.

The nozzles 33 in the first nozzle array K1 are an example of first nozzles. The nozzles 33 in the second nozzle array K2 are an example of second nozzles. The nozzles 33 in the third nozzle array K3 are an example of third nozzles. The nozzles 33 in the fourth nozzle array K4 are an example of fourth nozzles. Although four nozzles 33 are shown for each nozzle array in FIG. 4A, the actual number of nozzles 33 in each nozzle array is more than four. Further, although the head 32 includes four nozzle arrays, the head 32 may include two nozzle arrays, or an even number of nozzle arrays of six or more.

In FIG. 4A, the plurality of nozzles 33 are formed in the head 32 such that the positions of the nozzles in the sub-scanning direction are different among each nozzle array. Alternatively, a plurality of nozzles 33 may be formed on the head 32 such that the positions of the nozzles in the sub-scanning direction are the same among each nozzle array, and the head 32 may be mounted on the carriage 31 in a state where the head 32 is tilted by a small angle (rotated by a small angle in the horizontal plane).

[Operating Mode of Printer 10]

The printer 10 operates in either a high image quality mode or a high speed mode. FIG. 4B shows an enlarged image printed in the high image quality mode. FIG. 4C shows an enlarged image printed in the high speed mode. Black circles shown in FIGS. 4B and 4C indicate dots formed by ink ejected from the nozzles 33.

In the high image quality mode (FIG. 4B), the carriage 31 moves at a particular speed in the main scanning direction. Each time the carriage 31 moves in the main scanning direction by 1/600 inch, ink is ejected from the nozzles 33 in the first to fourth nozzle arrays K1 to K4. In this case, one line of an image is formed by a dot group of ink ejected from one nozzle 33. Thus, in the high image quality mode, an image having a resolution of 600 dpi in the main scanning direction and a resolution of 1200 dpi in the sub-scanning direction is formed on a sheet.

In the high speed mode (FIG. 4C), the carriage 31 moves in the main scanning direction at a faster speed than in the high image quality mode. Each time the carriage 31 moves in the main scanning direction by 1/300 inch, ink is ejected from the nozzles 33 in the first nozzle array K1 to the fourth nozzle array K4. However, the ink ejection timing from the nozzles 33 in the second nozzle array K2 and the fourth nozzle array K4 is set to be later such that landing positions of ink ejected from these nozzles are shifted, by 1/600 inch in the main scanning direction of the carriage 31, relative to landing positions of ink ejected from the nozzles 33 in the first nozzle array K1 and the third nozzle array K3.

In this case, one line of an image is formed by a dot group of ink ejected from one nozzle 33 and a dot group of ink ejected from an adjacent nozzle 33. Specifically, an odd-numbered line (first line, third line, . . . , in FIG. 4C) of the image is formed by a dot group of ink ejected from the nozzles 33 in the first nozzle array K1 and a dot group of ink ejected from the nozzles 33 in the second nozzle array K2. An even-numbered line (second line, fourth line, . . . , in FIG. 4C) of the image is formed by a dot group of ink ejected from the nozzles 33 in the third nozzle array K3 and a dot group of ink ejected from the nozzles 33 in the fourth nozzle array K4. The interval between dots in the main scanning direction is 1/600 inch. Thus, in the high speed mode, an image with a resolution of 600 dpi in the main scanning direction and a resolution of 600 dpi in the sub-scanning direction is printed.

The distance in the main scanning direction between dots of ink ejected from the first nozzle array K1 is 1/600 inch in the high image quality mode and 1/300 inch in the high speed mode. Thus, the distance in the main scanning direction between dots of ink ejected from the nozzles 33 in the first nozzle array K1 in the high speed mode is greater than the distance in the main scanning direction between dots of ink ejected from the nozzles 33 in the first nozzle array K1 in the high image quality mode.

[Drive Signal for Nozzle 33 in High Speed Mode]

Figure 5:
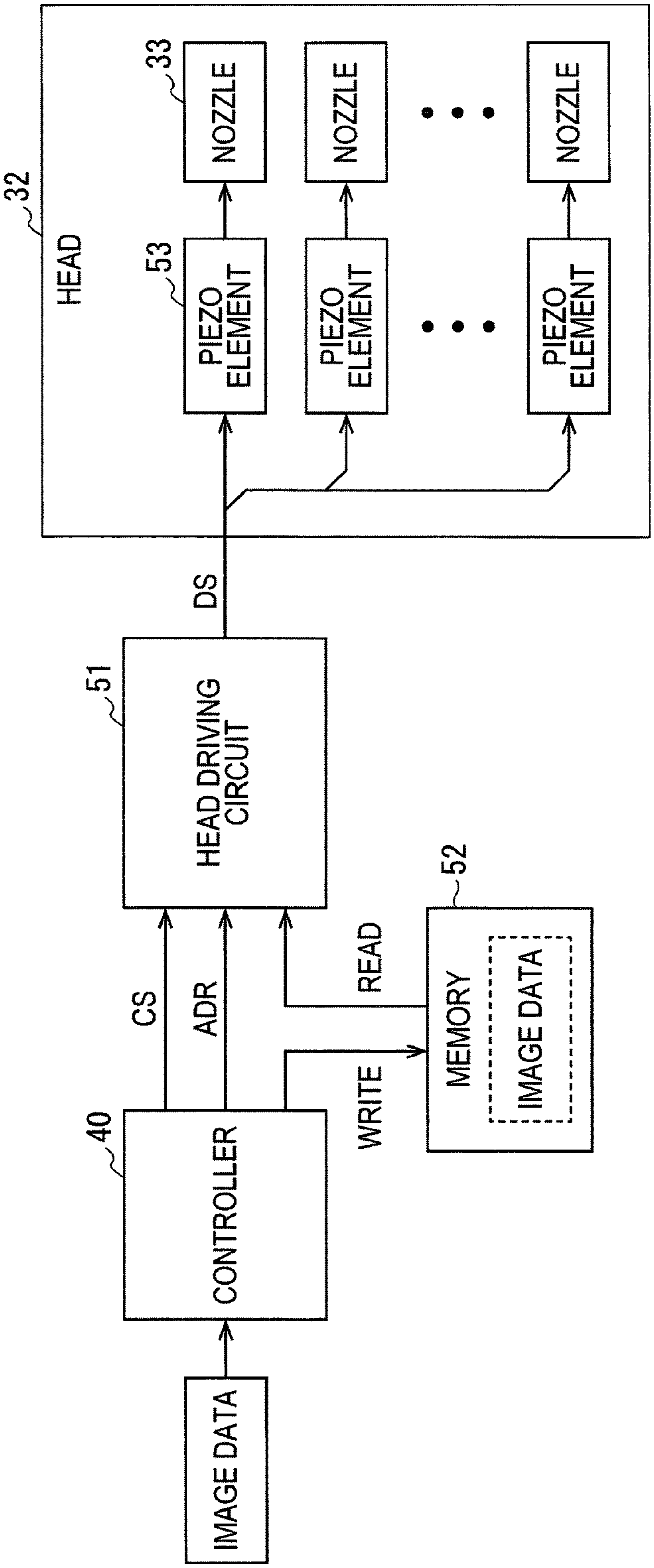
FIG. 5 is a block diagram showing circuits around a head driving circuit 51.

A case where the printer 10 operates in the high speed mode will be described below. As shown in FIG. 5, the printer 10 includes a head driving circuit 51 (an example of a driving circuit) and a memory 52 between the controller 40 and the head 32. The controller 40 acquires image data of an image to be formed in the high speed mode from the outside. The controller 40 executes a storing process for storing acquired image data in the memory 52 and a control process for controlling the head driving circuit 51.

The image data stored in the memory 52 is, for example, image data that has been transmitted from the controller 110 of the computer 100. The image data indicates the amount of ink (droplet size) to be ejected from the nozzle 33 of the head 32. The resolution of the image to be formed in the main scanning direction is 600 dpi, and the resolution in the sub scanning direction is also 600 dpi. Hereinafter, among image data for one line, data for forming odd-numbered dots in the main scanning direction in the image is referred to as “first data”, and data for forming even-numbered dots in the main scanning direction in the image is referred to as “second data”. Among image data for the next line, data for forming odd-numbered dots in the main scanning direction in the image is referred to as “third data”, and data for forming even-numbered dots in the main scanning direction in the image is referred to as “fourth data”. The memory 52 may be a memory different from the RAM 43 shown in FIG. 3, or may be a part of the RAM 43.

As shown in FIG. 5, the head 32 includes a plurality of piezo elements 53 corresponding to the plurality of nozzles 33. One piezo element 53 is provided corresponding to each nozzle 33. The head driving circuit 51 outputs a plurality of drive signals DS to the head 32 under the control of the controller 40. The plurality of drive signals DS are supplied to respective ones of the piezo elements 53. The piezo element 53 is a kind of a piezoelectric element, and deforms according to the voltage of the supplied drive signal DS. As a result, each nozzle 33 ejects an amount of ink corresponding to the drive signal DS at a timing defined by the drive signal DS.

The controller 40 outputs a control signal CS and an address ADR of the memory 52 to the head driving circuit 51 every ejection cycle. The ejection cycle is a cycle of ejecting ink from the nozzles 33. The ejection cycle is defined according to the amount of change per unit time in the relative position between the head 32 and the sheet. As the amount of change becomes larger (for example, as movement of the carriage 31 or conveyance of the sheet becomes faster), the ejection cycle becomes shorter. The control signal CS includes a signal indicating an instruction to shift an ink ejection timing. In response to receiving an instruction to shift the ink ejection timing from the controller 40, the head driving circuit 51 delays the ink ejection timing of the nozzles 33 in the second nozzle array K2 and the fourth nozzle array K4 such that the landing positions of ink ejected from these nozzles 33 are shifted by 1/600 inch in the main scanning direction of the carriage 31 relative to the landing positions of ink ejected from the nozzles 33 in the first nozzle array K1 and the third nozzle array K3. The address ADR for one ejection cycle includes addresses of image data to be ejected by nozzles 33 in the first to fourth nozzle arrays K1 to K4 at the designated ejection timing for one time.

In the high speed mode, the controller 40 outputs, to the head driving circuit 51, the address of the first data in the memory 52, the address of the second data in the memory 52, the address of the third data in the memory 52, and the address of the fourth data in the memory 52 among image data for one ejection cycle, in an identifiable manner. For example, when the carriage 31 is moved rightward, the controller 40 outputs the addresses of the first to fourth data corresponding to the nozzles 33 in the first to fourth rows (see FIG. 4A), and then sequentially outputs the addresses of the first to fourth data corresponding to the nozzles 33 in the fifth to eighth rows. Alternatively, the controller 40 may continuously output the addresses of the first data for the nozzles in the first nozzle array K1, then continuously output the addresses of the second data for the nozzles in the second nozzle array K2, then continuously output the addresses of the third data for the nozzles in the third nozzle array K3, and then continuously output the addresses of the fourth data for the nozzles in the fourth nozzle array K4.

The head driving circuit 51 reads image data from the memory 52 by using the address ADR output from the controller 40, and generates drive signals DS based on the read image data. More specifically, by using the addresses ADR output from the controller 40, the head driving circuit 51 reads the first data and the second data of the image data for one ejection cycle from the memory 52, and generates the drive signal DS for the nozzles 33 in the first nozzle array K1 based on the read first data and generates the drive signal DS for the nozzles 33 in the second nozzle array K2 based on the read second data.

Further, by using the addresses ADR output from the controller 40, the head driving circuit 51 reads the third data and the fourth data of the image data for one ejection cycle from the memory 52, and generates the drive signal DS for the nozzles 33 in the third nozzle array K3 based on the read third data and generates the drive signal DS for the nozzles 33 in the fourth nozzle array K4 based on the read fourth data. The head driving circuit 51 outputs the drive signals DS generated in this way to the head 32.

Figure 6A:
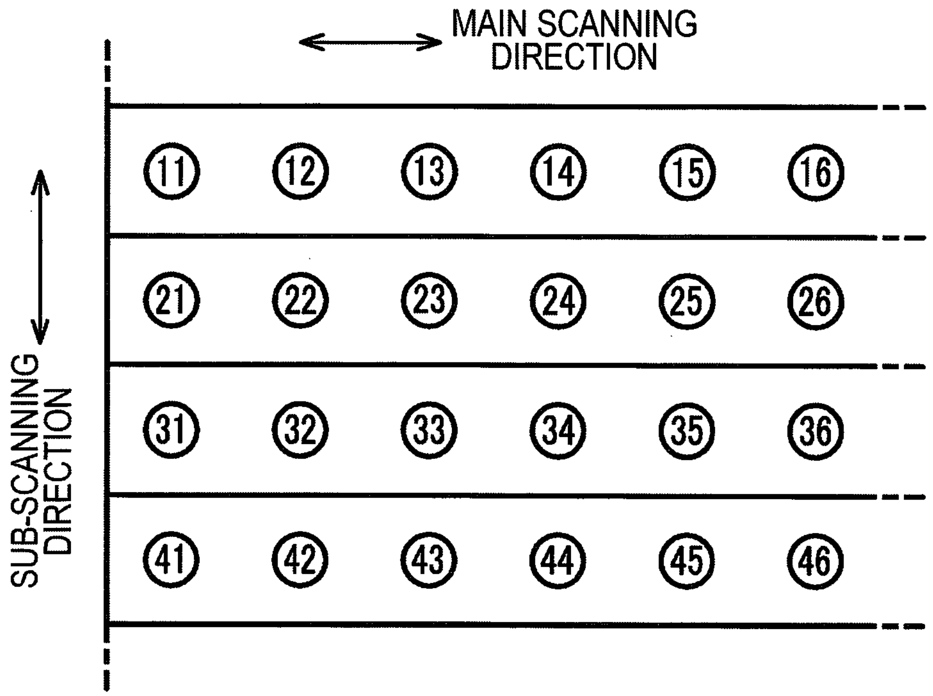
FIG. 6A is a diagram showing an example of image data.

In image data shown in FIG. 6A, circles indicate data corresponding to pixels forming an image, and two numbers attached to each circle indicate the vertical position and the horizontal position of the pixel. Numbers i and j are natural numbers, and the data corresponding to the circle with numbers ij is referred to as Dij.

When the memory 52 stores the image data shown in FIG. 6A and the carriage 31 is moved rightward, the controller 40 outputs, to the head driving circuit 51, the addresses in the memory 52 of data D11, D12, D21, D22, and so on, where j is 1 or 2, regarding image data for one ejection cycle. Among the image data for one ejection cycle, data such as data D11 and D31 where i is an odd number and j is 1 are first data (data for forming odd-numbered dots), data such as data D12 and D32 where i is an odd number and j is 2 are second data (data for forming even-numbered dots), data such as data D21 and D41 where i is an even number and j is 1 are third data (data for forming odd-numbered dots), and data such as data D22 and D42 where i is an even number and j is 2 are fourth data (data for forming even-numbered dots).

The controller 40 outputs, to the head driving circuit 51, the addresses of the first data D11, D31 and so on in the memory 52, the addresses of the second data D12, D32 and so on in the memory 52, the addresses of the third data D21, D41 and so on in the memory 52, and the addresses of the fourth data D22, D42 and so on in the memory 52 in an identifiable manner (that is, the addresses of the first to fourth data are identifiable from one another). For example, the controller 40 sequentially outputs the addresses of the first to fourth data in the memory 52 in the order of the address of the data D11, the address of the data D12, the address of the data D21, the address of the data D22, and so on.

The head driving circuit 51 reads data D11, D12, D21, D22, D31, D32, D41, D42, and so on, from the memory 52 by using the addresses ADR output from the controller 40. The head driving circuit 51 generates the drive signal DS for the nozzle 33 in the first nozzle array K1 based on the data D11, generates the drive signal DS for the nozzle 33 in the second nozzle array K2 based on the data D12, generates the drive signal DS for the nozzle 33 in the third nozzle array K3 based on the data D21, and generates the drive signal DS for the nozzle 33 in the fourth nozzle array K4 based on the data D22. The head driving circuit 51 generates the drive signal DS in a similar manner based on other data. The head driving circuit 51 outputs the generated drive signals DS to the head 32.

Next, the controller 40 outputs, to the head driving circuit 51, the addresses in the memory 52 of the data D13, D14, D23, D24, and so on, where j is 3 or 4 for image data for the next one ejection cycle. The controller 40 outputs the addresses of the first data D13, D33, and so on, in the memory 52, the addresses of the second data D14, D34, and so on, in the memory 52, the addresses of the third data D23, D43, and so on, in the memory 52, and the addresses of the fourth data D24, D44, and so on, in the memory 52 among the image data for the next one ejection cycle in an identifiable manner.

The head driving circuit 51 reads data D13, D14, D23, D24, D33, D34, D43, D44, and so on, from the memory 52 by using the addresses ADR output from the controller 40. The head driving circuit 51 generates the drive signal DS for the nozzle 33 in the first nozzle array K1 based on the data D13, generates the drive signal DS for the nozzle 33 in the second nozzle array K2 based on the data D14, generates the drive signal DS for the nozzle 33 in the third nozzle array K3 based on the data D23, and generates the drive signal DS for the nozzle 33 in the fourth nozzle array K4 based on the data D24. The head driving circuit 51 generates the drives signal DS in a similar manner based on other data. The head driving circuit 51 outputs the generated drive signals DS to the head 32. After that, the controller 40 and the head driving circuit 51 operate similarly.

As a result of this operation, under the control by the controller 40, the head driving circuit 51 outputs the drive signals DS for the nozzles 33 in the first nozzle array K1 based on the first data for forming odd-numbered dots in the main scanning direction (for example, data such as D11 and D13 where j is an odd number) among image data for one line stored in the memory 52 (for example, data D11, D12, D13, and so on, where i is 1), and outputs the drive signals DS for the nozzles 33 in the second nozzle array K2 based on the second data for forming even-numbered dots in the main scanning direction (for example, data such as D12 and D14 where j is an even number).

Figure 6B:
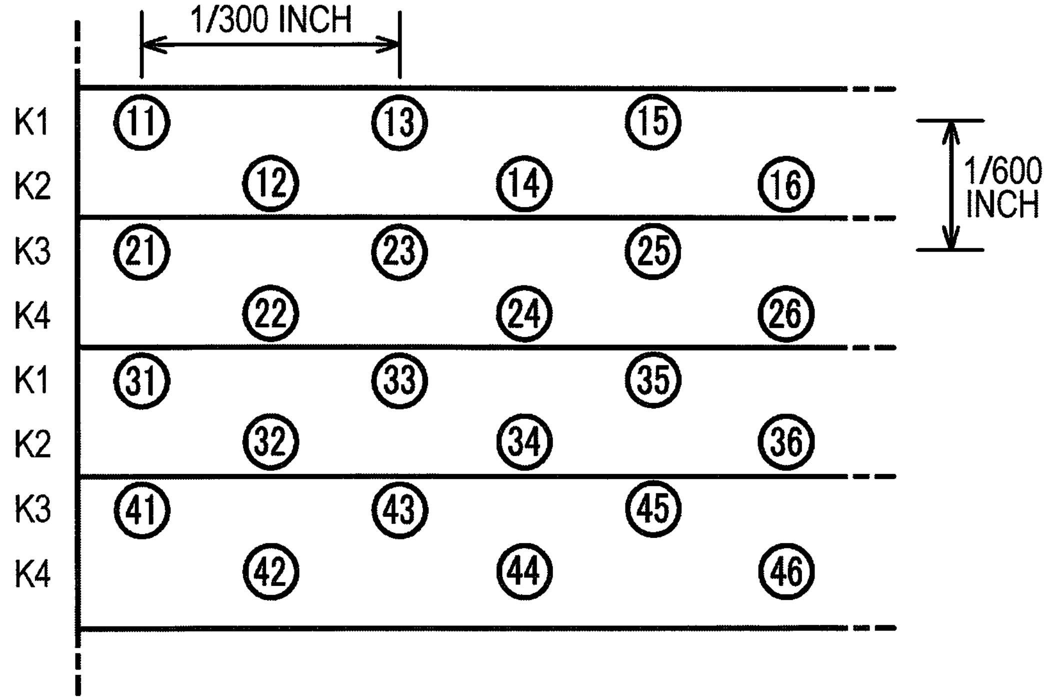
FIG. 6B is a diagram showing a correspondence relationship between dots forming an image and the nozzles 33.

The nozzles 33 in the first to fourth nozzle arrays K1 to K4 eject ink in amounts corresponding to the supplied drive signals DS. As a result, ink is ejected from the nozzles 33 in the first to fourth nozzle arrays K1 to K4 as shown in FIG. 6B. In FIG. 6B, a certain line of an image is formed by dots of ink ejected from the nozzles 33 in the first nozzle array K1 and dots of ink ejected from the nozzles 33 in the second nozzle array K2. The next line of the image is formed by dots of ink ejected from the nozzles 33 in the third nozzle array K3 and dots of ink ejected from the nozzles 33 in the fourth nozzle array K4.

[High Speed Mode Printing Process]

Figure 7:
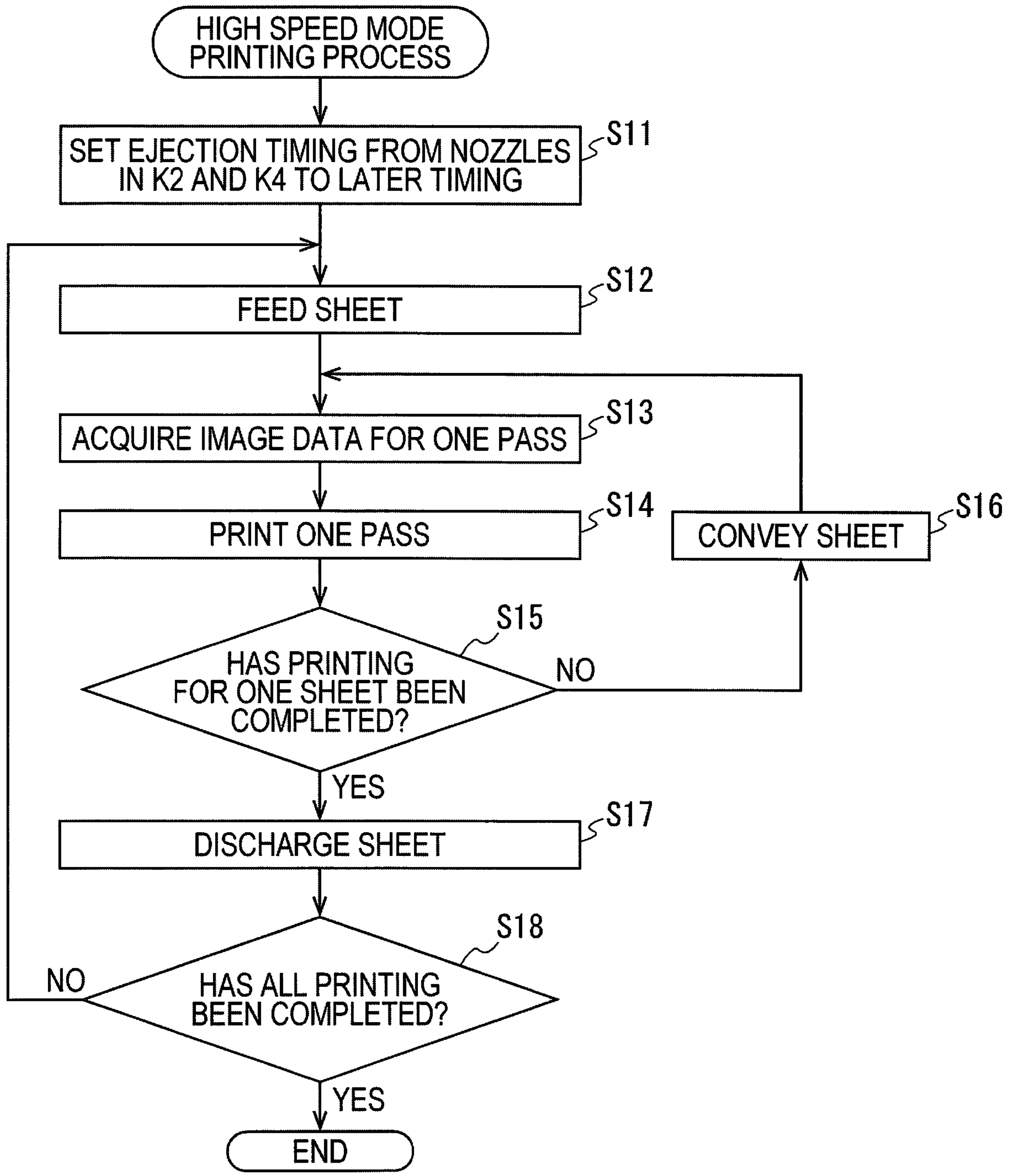
FIG. 7 is a flowchart of a high speed mode printing process.

In response to receiving an instruction for high speed mode printing, the controller 40 of the printer 10 executes a high speed mode printing process shown in FIG. 7. At the beginning of the high speed mode printing process, the controller 40 sets the ink ejection timing from the nozzles 33 in the second nozzle array K2 and the fourth nozzle array K4 to later timing such that the landing positions of ink ejected from these nozzles 33 are shifted by 1/600 inch in the main scanning direction of the carriage 31 relative to the landing positions of ink ejected from the nozzles 33 in the first nozzle array K1 and the third nozzle array K3 (S11).

Next, the controller 40 feeds a sheet supported by the feed tray 14 (S12). In S12, the controller 40 drives a feed motor (not shown). Thereby, the feed roller 21 feeds the sheet supported by the feed tray 14 to the conveyance path. The controller 40 also drives a conveyance motor (not shown). When the leading edge of the sheet fed to the conveyance path by the feed roller 21 reaches the conveyance roller 22, the conveyance roller 22 conveys the sheet forward along the conveyance path.

Next, the controller 40 acquires image data for one pass of the image to be formed (S13). In S13, the controller 40 receives, via the communication interface 46, image data output from the computer 100 via the communication interface 106 and stores the received image data in the memory 52.

Next, the controller 40 prints an image for one pass on the sheet (S14). In one pass of printing, the controller 40 causes the nozzles 33 of the head 32 to eject ink while moving the carriage 31 once in the left-right direction 9. In S14, the controller 40 moves the carriage 31 to eject ink from all the nozzles 33 included in the head 32.

Next, the controller 40 determines whether printing for one sheet has been completed (S15). In response to determining in S15 that printing for one sheet has not been completed (S15: No), the controller 40 proceeds to S16. In this case, the controller 40 causes the sheet to be conveyed by a particular amount (S16). In S16, the controller 40 drives the conveyance motor to cause the conveyance roller 22 and the discharge roller 24 to convey the sheet by the particular amount. After that, the controller 40 returns to S13.

In response to determining in S15 that printing for one sheet has been completed (S15: Yes), the controller 40 proceeds to S17. In this case, the controller 40 causes the sheet to be discharged (S17). In S17, the controller 40 controls the conveyance roller 22 and the discharge roller 24 to convey the sheet by a particular amount and discharge the sheet to the discharge tray 15.

Next, the controller 40 determines whether all printing has been completed (S18). In response to determining in S18 that all printing has not been completed (S18: No), the controller 40 returns to S12. In this case, the controller 40 executes S12 to S18 to print the next page. In response to determining in S18 that all printing has been completed (S18: Yes), the controller 40 ends the high speed mode printing process.

The controller 40 completes acquisition of image data necessary for printing one pass before printing one pass. For example, after S12, the controller 40 may acquire image data necessary for printing one sheet. Alternatively, the controller 40 may acquire more image data than one pass in S13. The controller 40 may acquire image data in parallel with sheet feeding or sheet conveyance.

Operations and Effects

As described above, the printer 10 according to the present embodiment includes the first nozzle array K1 in which the plurality of nozzles 33 are arranged in the sub-scanning direction at the pitch P, the second nozzle array K2 in which the plurality of nozzles 33 are arranged in the sub-scanning direction at the same pitch P, the head 32 including at least the first nozzle array K1 and the second nozzle array K2, the carriage 31 on which the head 32 is mounted and movable in the main scanning direction crossing the sub-scanning direction, the head driving circuit 51 that outputs the drive signal DS to each of the nozzles 33, the controller 40, and the memory 52. The nozzles 33 in the second nozzle array K2 are located at positions shifted in the sub-scanning direction from the nozzles 33 in the first nozzle array K1. The controller 40 executes a storing process for storing image data in the memory 52 and a control process for controlling the head driving circuit 51. Based on control of the controller 40, the head driving circuit 51 outputs the drive signals DS for the nozzles 33 in the first nozzle array K1 based on the first data for forming the odd-numbered dots in the main scanning direction in the image among image data for one line stored in the memory 52, and outputs the drive signals DS for the nozzles 33 in the second nozzle array K2 based on the second data for forming the even-numbered dots in the main scanning direction in the image.

According to the printer 10 described above, ink is ejected at high speed by alternately ejecting ink from the two nozzles 33 based on image data for one line. Further, the head driving circuit 51 outputs the drive signal DS for the nozzle 33 in the first nozzle array K1 and the drive signal DS for the nozzle 33 in the second nozzle array K2 based on image data for one line stored in the memory 52. Thus, the drive signals DS for the nozzles 33 are generated based on the image data without using a memory other than the memory 52. Thus, when ejecting ink at high speed, the drive signals DS for the nozzles 33 are generated based on the image data while reducing the amount of memory.

The controller 40 outputs, to the head driving circuit 51, the address ADR of the first data in the memory 52 and the address ADR of the second data in the memory 52 in such a manner that it is identifiable whether the address ADR relates to the first data or the second data among the addresses of image data for one line. The head driving circuit 51 reads the first data and the second data from the memory 52 by using the addresses ADR output from the controller 40. The head driving circuit 51 outputs the drive signals DS for the nozzles 33 in the first nozzle array K1 based on the first data read from the memory 52, outputs the drive signals DS for the nozzles 33 in the second nozzle array K2 based on the second data read from the memory 52. Thus, the head driving circuit 51 reads the image data from the memory 52 by using the addresses ADR output from the controller 40, and output the drive signals DS for the nozzles 33 based on the read image data.

The controller 40 outputs, to the head driving circuit 51, an instruction to shift the ink ejection timing. In response to receiving the instruction from the controller 40, the head driving circuit 51 outputs the drive signal DS for shifting the ink ejection timing such that the landing positions of the ink ejected from the nozzles 33 in the first nozzle array K1 and the landing positions of the ink ejected from the nozzles 33 in the second nozzle array are shifted in the main scanning direction. Thus, a dot row of ink output from the nozzle 33 in the first nozzle array K1 and a dot row of ink output from the nozzle 33 in the second nozzle array K2 are formed at positions shifted in the main scanning direction.

The head 32 includes the third nozzle array K3 in which a plurality of nozzles 33 are arranged at the same pitch P in the sub-scanning direction, and the fourth nozzle array K4 in which a plurality of nozzles 33 are arranged at the same pitch in the sub-scanning direction. The nozzles 33 in the second nozzle array K2 are located at positions shifted by ¼ of the pitch Pin the sub-scanning direction from the nozzles 33 in the first nozzle array K1. The nozzles 33 in the third nozzle array K3 are located at positions shifted by ½ of the pitch P in the sub-scanning direction from the nozzles 33 in the first nozzle array K1. The nozzles 33 in the fourth nozzle array K4 are located at positions shifted by ¾ of the pitch P in the sub-scanning direction from the nozzles 33 in the first nozzle array K1. Based on control of the controller 40, the head driving circuit 51 outputs the drive signals DS for the nozzles 33 in the third nozzle array K3 based on the third data for forming the odd-numbered dots in the main scanning direction in the image among image data for the next one line stored in the memory 52, and outputs the drive signals DS for the nozzles 33 in the fourth nozzle array K4 based on the fourth data for forming the even-numbered dots in the main scanning direction in the image. Thus, in the printer 10 including the first to fourth nozzle arrays K1 to K4, when ejecting ink at high speed, the drive signals DS for the nozzles 33 are generated based on the image data while reducing the amount of memory.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

Modification

Various modifications may be made for the printer 10 according to the above-described embodiment. For example, a printer according to a modification may operate in a normal mode in addition to the high image quality mode and the high speed mode. In the normal mode, the carriage 31 moves in the main scanning direction at the same speed as in the high image quality mode. In the printer according to the modification, the controller 40 is configured to switch the moving speed of the carriage 31 between a high speed mode and a normal mode which is slower than the high speed mode. In the printer according to the modification, either one of the first nozzle array K1 or the second nozzle array K2 and either one of the third nozzle array K3 or the fourth nozzle array K4 are used for ejecting ink. For example, the first nozzle array K1 and the third nozzle array K3 are used for ejecting ink.

In the normal mode, the memory 52 stores the same image data as in the high speed mode. The controller 40 outputs the control signal CS and the address ADR in the memory 52 to the head driving circuit 51. The controller 40 outputs the address of the first data and the address of the second data to the head driving circuit 51.

The head driving circuit 51 reads the first data and the second data from the memory 52 by using the addresses ADR output from the controller 40. In the normal mode, the head driving circuit 51 generates either the drive signal DS for the nozzles 33 in the first nozzle array K1 or the drive signal DS for the nozzles 33 in the second nozzle array K2 based on the read first data and second data. The head driving circuit 51 outputs the drive signal DS to the head 32 under the control of the controller 40.

When the printer 10 operates in the normal mode, the controller 40 controls the moving speed of the carriage 31 to the particular speed described above. When the printer 10 operates in the high speed mode, the controller 40 controls the moving speed of the carriage 31 to be a higher speed than the particular speed. According to the printer according to the modification, the controller 40 outputs the address of image data in the memory 52 in a suitable manner depending on the high speed mode and the normal mode.

Other Modifications

The printer 10 of the above-described embodiment has the sub-tank 35. A printer according to a modification may not have the sub-tank 35. In the printer 10 of the above-described embodiment, the cartridge 37 is mounted in the mount case 36 outside the carriage 31. In a printer according to a modification, the cartridge 37 may be mounted in a mount case on the carriage 31. Further, the printer 10 of the above-described embodiment is a cartridge-type printer in which the cartridge 37 is detachably attached to the mount case 36. A printer according to a modification may be a tank-type printer that includes a tank and ink is filled in the tank.

The present disclosure may also be applied to a liquid ejection apparatus in which the head 32 has two nozzle arrays or nozzle arrays of an even number of six or more. In a liquid ejection apparatus including N (N is an even number) nozzle arrays, the pitch of the nozzles 33 in each nozzle array in the sub-scanning direction (hereinafter referred to as a nozzle pitch) is the same, and the nozzles in the first to the N-th nozzle arrays may be sequentially shifted by 1/N of the nozzle pitch in the sub-scanning direction. For example, in a liquid ejection apparatus including two nozzle arrays, the nozzles in the second nozzle array may be shifted from the nozzles in the first nozzle array by ½ of the nozzle pitch in the sub-scanning direction. In a liquid ejection apparatus including six nozzle arrays, the nozzles in the second nozzle array may be shifted from the nozzles in the first nozzle array by ⅙ of the nozzle pitch in the sub-scanning direction, the nozzles in the third nozzle array may be shifted from the nozzles in the first nozzle array by ⅓ of the nozzle pitch in the sub-scanning direction, the nozzles in the fourth nozzle array may be shifted from the nozzles in the first nozzle array by ½ of the nozzle pitch in the sub-scanning direction, the nozzles in the fifth nozzle array may be shifted from the nozzles in the first nozzle array by ⅔ of the nozzle pitch in the sub-scanning direction, and the nozzles in the sixth nozzle array may be shifted from the nozzles in the first nozzle array by ⅚ of the nozzle pitch in the sub-scanning direction.

In the above-described embodiment, the nozzle pitch is 1/300 inch, an image with a resolution of 600 dpi in the main scanning direction and a resolution of 600 dpi in the sub-scanning direction is printed in the high speed mode. However, the nozzle pitch of the liquid ejection apparatus and the resolution of a formed image are not limited to the above values. The present disclosure may also be applied to liquid ejection apparatuses having other nozzle pitches and liquid ejection apparatuses that form images with other resolutions. The printer 10 according to the above embodiment is a monochrome printer that ejects black ink. A printer according to a modification may be a color printer that ejects ink of a plurality of colors.

What is claimed is:

1. A liquid ejection apparatus comprising:

a head including at least a first nozzle array and a second nozzle array, the first nozzle array including nozzles arranged at a particular pitch in a first direction, the second nozzle array including nozzles arranged at the particular pitch in the first direction, the nozzles in the second nozzle array being located at positions shifted from the nozzles in the first nozzle array in the first direction;

a carriage on which the head is mounted, the carriage being configured to move in a second direction crossing the first direction;

a driving circuit configured to output a drive signal to each of the nozzles;

a memory; and a controller configured to perform:

storing, in the memory, image data of an image to be formed; and controlling the driving circuit to:

output the drive signal for a first nozzle in the first nozzle array based on first data among one-line image data stored in the memory, the one-line image data being the image data for one line in the second direction in the image, the first data forming odd-numbered dots of the one line in the second direction in the image; and output the drive signal for a second nozzle in the second nozzle array based on second data among the one-line image data, the second data forming even-numbered dots of the one line in the second direction in the image, wherein the controller is configured to output addresses to the driving circuit in such a manner that it is identifiable whether each of the addresses is a first address or a second address, the first address being an address in the memory at which the first data is stored, the second address being an address in the memory at which the second data is stored; and wherein the driving circuit is configured to:

read the first data and the second data from the memory by using the addresses output from the controller;

output the drive signal for the first nozzle based on the first data read from the memory; and output the drive signal for the second nozzle based on the second data read from the memory.

2. The liquid ejection apparatus according to claim 1, wherein the controller is configured to switch a moving speed of the carriage between a high speed mode and a normal mode in which the moving speed of the carriage is lower than the high speed mode;

wherein the controller is configured to:

in the high speed mode, output the addresses to the driving circuit in such a manner that it is identifiable whether each of the addresses is the first address or the second address; and in the normal mode, output, to the driving circuit, the addresses including the first address and the second address;

wherein the driving circuit is configured to:

read the first data and the second data from the memory by using the addresses output from the controller;

in the high speed mode, output the drive signal for the first nozzle based on the first data read from the memory, and output the drive signal for the second nozzle based on the second data read from the memory; and in the normal mode, output either the drive signal for the first nozzle or the drive signal for the second nozzle based on the first data and the second data read from the memory.

3. A liquid ejection apparatus comprising:

a head including at least a first nozzle array and a second nozzle array, the first nozzle array including nozzles arranged at a particular pitch in a first direction, the second nozzle array including nozzles arranged at the particular pitch in the first direction, the nozzles in the second nozzle array being located at positions shifted from the nozzles in the first nozzle array in the first direction;

a carriage on which the head is mounted, the carriage being configured to move in a second direction crossing the first direction;

a driving circuit configured to output a drive signal to each of the nozzles;

a memory; and a controller configured to perform:

storing, in the memory, image data of an image to be formed; and controlling the driving circuit to:

output the drive signal for a first nozzle in the first nozzle array based on first data among one-line image data stored in the memory, the one-line image data being the image data for one line in the second direction in the image, the first data forming odd-numbered dots of the one line in the second direction in the image; and output the drive signal for a second nozzle in the second nozzle array based on second data among the one-line image data, the second data forming even-numbered dots of the one line in the second direction in the image, wherein the controller is further configured to output, to the driving circuit, an instruction of shifting a liquid ejection timing; and wherein the driving circuit is configured to:

in response to receiving the instruction from the controller, output the drive signal for shifting the liquid ejection timing such that landing positions of liquid ejected from the second nozzle are shifted from landing positions of liquid ejected from the first nozzle in the second direction.

4. A liquid ejection apparatus comprising:

a head including at least a first nozzle array and a second nozzle array, the first nozzle array including nozzles arranged at a particular pitch in a first direction, the second nozzle array including nozzles arranged at the particular pitch in the first direction, the nozzles in the second nozzle array being located at positions shifted from the nozzles in the first nozzle array in the first direction, wherein the head further includes: a third nozzle array including nozzles arranged at the particular pitch in the first direction; and a fourth nozzle array including nozzles arranged at the particular pitch in the first direction;

a carriage on which the head is mounted, the carriage being configured to move in a second direction crossing the first direction;

a driving circuit configured to output a drive signal to each of the nozzles;

a memory; and a controller configured to perform:

storing, in the memory, image data of an image to be formed; and controlling the driving circuit to:

output the drive signal for a first nozzle in the first nozzle array based on first data among one-line image data stored in the memory, the one-line image data being the image data for one line in the second direction in the image, the first data forming odd-numbered dots of the one line in the second direction in the image; and output the drive signal for a second nozzle in the second nozzle array based on second data among the one-line image data, the second data forming even-numbered dots of the one line in the second direction in the image, wherein the second nozzle is located at a position shifted by ¼ of the particular pitch from the first nozzle in the first direction;

wherein a third nozzle in the third nozzle array is located at a position shifted by ½ of the particular pitch from the first nozzle in the first direction;

wherein a fourth nozzle in the fourth nozzle array is located at a position shifted by ¾ of the particular pitch from the first nozzle in the first direction; and wherein the controller is configured to control the driving circuit to:

output the drive signal for the third nozzle based on third data among next-line image data stored in the memory, the next-line image data being the image data for next one line in the second direction in the image, the third data forming odd-numbered dots of the next one line in the second direction in the image; and output the drive signal for the fourth nozzle based on fourth data among the next-line image data, the fourth data forming even-numbered dots of the next one line in the second direction in the image.

5. The liquid ejection apparatus according to claim 4, wherein the controller is configured to:

output a first address to the driving circuit, the first address being an address in the memory at which the first data corresponding to the first nozzle in a first row in the first direction is stored, output a second address to the driving circuit, the second address being an address in the memory at which the second data corresponding to the second nozzle in a second row in the first direction is stored, output a third address to the driving circuit, the third address being an address in the memory at which the third data corresponding to the third nozzle in a third row in the first direction is stored, output a fourth address to the driving circuit, the fourth address being an address in the memory at which the fourth data corresponding to the fourth nozzle in a fourth row in the first direction is stored; and then output a fifth address to the driving circuit, the fifth address being an address in the memory at which the first data corresponding to the first nozzle in a fifth row in the first direction is stored, output a sixth address to the driving circuit, the sixth address being an address in the memory at which the second data corresponding to the second nozzle in a sixth row in the first direction is stored, output a seventh address to the driving circuit, the seventh address being an address in the memory at which the third data corresponding to the third nozzle in a seventh row in the first direction is stored, and output an eighth address to the driving circuit, the eighth address being an address in the memory at which the fourth data corresponding to the fourth nozzle in an eighth row in the first direction is stored.

6. The liquid ejection apparatus according to claim 4, wherein the controller is configured to:

continuously output first addresses to the driving circuit, the first addresses being addresses in the memory at which the first data for the nozzles in the first nozzle array are stored;

then continuously output second addresses to the driving circuit, the second addresses being addresses in the memory at which the second data for the nozzles in the second nozzle array are stored;

then continuously output third addresses to the driving circuit, the third addresses being addresses in the memory at which the third data for the nozzles in the third nozzle array are stored; and then continuously output fourth addresses to the driving circuit, the fourth addresses being addresses in the memory at which the fourth data for the nozzles in the fourth nozzle array are stored.

* * * * *